US012723723B2

(12) United States Patent
Kim et al.

(10) Patent No.: US 12,723,723 B2
(45) Date of Patent: Sep. 1, 2026

(54) VEHICLE LAMP

(71) Applicant: SL Corporation, Daegu (KR)

(72) Inventors: Hyeong Do Kim, Gyeongsan-si (KR); Hyo Jin Han, Gyeongsan-si (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 19/244,823

(22) Filed: Jun. 20, 2025

(65) Prior Publication Data

US 2026/0049702 A1 Feb. 19, 2026

Related U.S. Application Data

(63) Continuation of application No. PCT/KR2023/020055, filed on Dec. 7, 2023.

(30) Foreign Application Priority Data

Dec. 23, 2022 (KR) ........................ 10-2022-0182502

(51) Int. Cl.

| | |
|---|---|
| ***F21S 41/265*** | (2018.01) |
| ***F21S 41/20*** | (2018.01) |
| ***F21W 102/13*** | (2018.01) |
| ***F21Y 115/10*** | (2016.01) |

(52) U.S. Cl.

CPC ........... *F21S 41/265* (2018.01); *F21S 41/285* (2018.01); *F21W 2102/13* (2018.01); *F21Y 2115/10* (2016.08)

(58) Field of Classification Search

CPC .............................. F21S 41/265; F21S 41/285

See application file for complete search history.

(56) References Cited

U.S. PATENT DOCUMENTS

| | | | | |
|---|---|---|---|---|
| 10,634,307 | B2 * | 4/2020 | Kim | B60Q 1/0011 |
| 11,644,170 | B2 * | 5/2023 | Go | F21S 41/265 362/520 |
| 2019/0024865 | A1 * | 1/2019 | Kim | F21S 41/285 |
| 2020/0207257 | A1 * | 7/2020 | Choi | B60Q 1/2607 |
| 2020/0386382 | A1 * | 12/2020 | Choi | F21S 41/285 |
| 2023/0358388 | A1 * | 11/2023 | Kang | F21V 5/007 |

* cited by examiner

*Primary Examiner* — Eric T Eide

(74) *Attorney, Agent, or Firm* — United One Law Group LLC; Kongsik Kim; Jhongwoo Peck

(57) ABSTRACT

A vehicle lamp, which is capable of forming an optimal beam pattern even where an optical system is installed in a tilted manner, includes: a light source unit; and an optical unit configured to transmit therethrough at least a portion of light incident from the light source unit to form a predetermined beam pattern. The optical unit includes an incident lens unit including a plurality of incident lenses and an emission lens unit including a plurality of emission lenses respectively corresponding to the plurality of incident lenses. A plurality of lens rows, in each of which the plurality of incident lenses and the plurality of emission lenses extend in a left-right direction, are arranged in an up-down direction. Each of the plurality of lens rows is inclined such that one side is disposed higher than the other side with respect to a horizontal line.

16 Claims, 16 Drawing Sheets

VEHICLE LAMP

CROSS-REFERENCE TO RELATED APPLICATIONS

This application is a Continuation of International Application No. PCT/KR2023/020055 filed Dec. 7, 2023, which claims priority from Korean Application No. 10-2022-0182502 filed Dec. 23, 2022. The aforementioned applications are incorporated herein by reference in their entireties.

TECHNICAL FIELD

The present disclosure relates to a vehicle lamp, and more particularly, to a vehicle lamp capable of forming an optimal beam pattern even where an optical system is installed in a tilted manner.

RELATED ART

In general, vehicles are equipped with various types of vehicle lamps that serve an illumination function to allow easier identification of objects located around the vehicles during low-light conditions (e.g., nighttime driving) and a signaling function to inform other vehicles or road users of the driving status of the vehicles.

For example, headlamps and fog lamps are mainly intended for the illumination function, while turn signal lamps, tail lamps, and brake lamps are primarily intended for the signaling function. Such vehicle lamps are specified by regulations in terms of installation standards and specifications so that each function is properly fulfilled.

Such vehicle lamps may need to have their optical system installed in a tilted manner depending on the shape of the outer surface of an outer lens, which forms a part of the vehicle's body line. When the optical system is installed in a tilted manner, the direction in which light is irradiated changes, making it more difficult to form a beam pattern that satisfies light distribution characteristics.

Accordingly, there is a need for a solution that allows an optimal beam pattern to be formed even when the optical system is installed in a tilted manner according to the vehicle's body line.

SUMMARY

One object to be achieved by the present disclosure is to provide a vehicle lamp that can form a beam pattern satisfying light distribution characteristics even when the optical system is installed in a tilted manner, conforming to the vehicle's body line.

The objects of the present disclosure are not limited to those mentioned above, and other objects not mentioned will be clearly understood by those skilled in the art from the following description.

According to an aspect of the present disclosure, a vehicle lamp may include a light source unit that generates light; and an optical unit configured to transmit therethrough at least a portion of the light incident from the light source unit to form a predetermined beam pattern. In particular, the optical unit may include an incident lens unit that includes a plurality of incident lenses and an emission lens unit that includes a plurality of emission lenses respectively corresponding to the plurality of incident lenses. A plurality of lens rows, in each of which the plurality of incident lenses and the plurality of emission lenses extend in a left-right direction, may be arranged in an up-down direction. Further, each of the plurality of lens rows may be inclined to allow one side thereof to be disposed higher than the other side with respect to a horizontal line.

The light source unit may include: a light source that generates the light; and a light path adjustment unit configured to convert the light emitted from the light source into substantially parallel light and to allow the parallel light to be incident on the optical unit.

Lens rows formed by the plurality of incident lenses may include a first lens row and a second lens row, which are alternately arranged in the up-down direction, and the plurality of incident lenses may include: a first incident lens that forms the first lens row; and a second incident lens that forms the second lens row and includes a plurality of incident regions having different light-concentrating powers. The first lens row may be formed by a single first incident lens, and the second lens row may be formed by a plurality of second incident lenses. The first incident lens may be formed as a cylindrical lens.

The light incident through the second incident lens may be emitted through a pair of adjacent first and second emission lenses among the plurality of emission lenses, and the plurality of incident regions may include a first incident region and a second incident region formed to have different widths in the left-right direction. The first incident region may be configured such that the light incident through the second incident lens may be collimated at or near a rear focal point of one of the first emission lens or the second emission lens and may be emitted through the corresponding first or second emission lens, to reinforce a high-illuminance region of the beam pattern. The light incident through the first incident region may be emitted through one of the first emission lens or the second emission lens in a direction substantially parallel to an optical axis of the light source unit.

The second incident region may be configured such that the light incident through the second incident lens may be collimated at a point disposed more rearward compared to the light collimated by the first incident region and may be emitted through both the first emission lens and the second emission lens, to reinforce a spread region of the beam pattern.

The first incident region may be formed to have a greater width than the second incident region.

The plurality of incident regions may further include a third incident region configured to allow the light incident through the second incident lens to proceed as substantially parallel light. The third incident region may be disposed between the first incident region and the second incident region.

The incident lens unit may include a first light transmission portion that includes the plurality of incident lenses arranged on an incident surface thereof, and the emission lens unit may include a second light transmission portion that includes the plurality of emission lenses disposed on an emission surface thereof. An emission surface of the first light transmission portion and an incident surface of the second light transmission portion may be abut each other. An interface between the first light transmission portion and the second light transmission portion may be a plane on which focal points of the plurality of emission lenses are disposed. The plurality of emission lenses may be formed thicker than the plurality of incident lenses, and the first light transmission portion may be formed thicker than the second light transmission portion.

The optical unit may be tilted such that one side in a left-right direction is disposed more forward relative to the other side thereof.

Other specific details of the present disclosure are included in the detailed description and drawings.

According to the vehicle lamp of the present disclosure as described above, the following effects can be obtained.

When light incident through a plurality of incident lenses is emitted through a plurality of emission lenses to form a beam pattern, at least one of the plurality of incident lenses is configured to include multiple incident regions that have different light-concentrating powers, so that the required light distribution characteristics of the beam pattern can be satisfied. Therefore, even when the optical system is installed in a tilted manner to conform to the vehicle's body line, an optimal beam pattern can be formed.

The effects of the present disclosure are not limited to those mentioned above, and other effects not mentioned will be clearly understood by those skilled in the art from the present disclosure.

DETAILED DESCRIPTION

Figure 1:
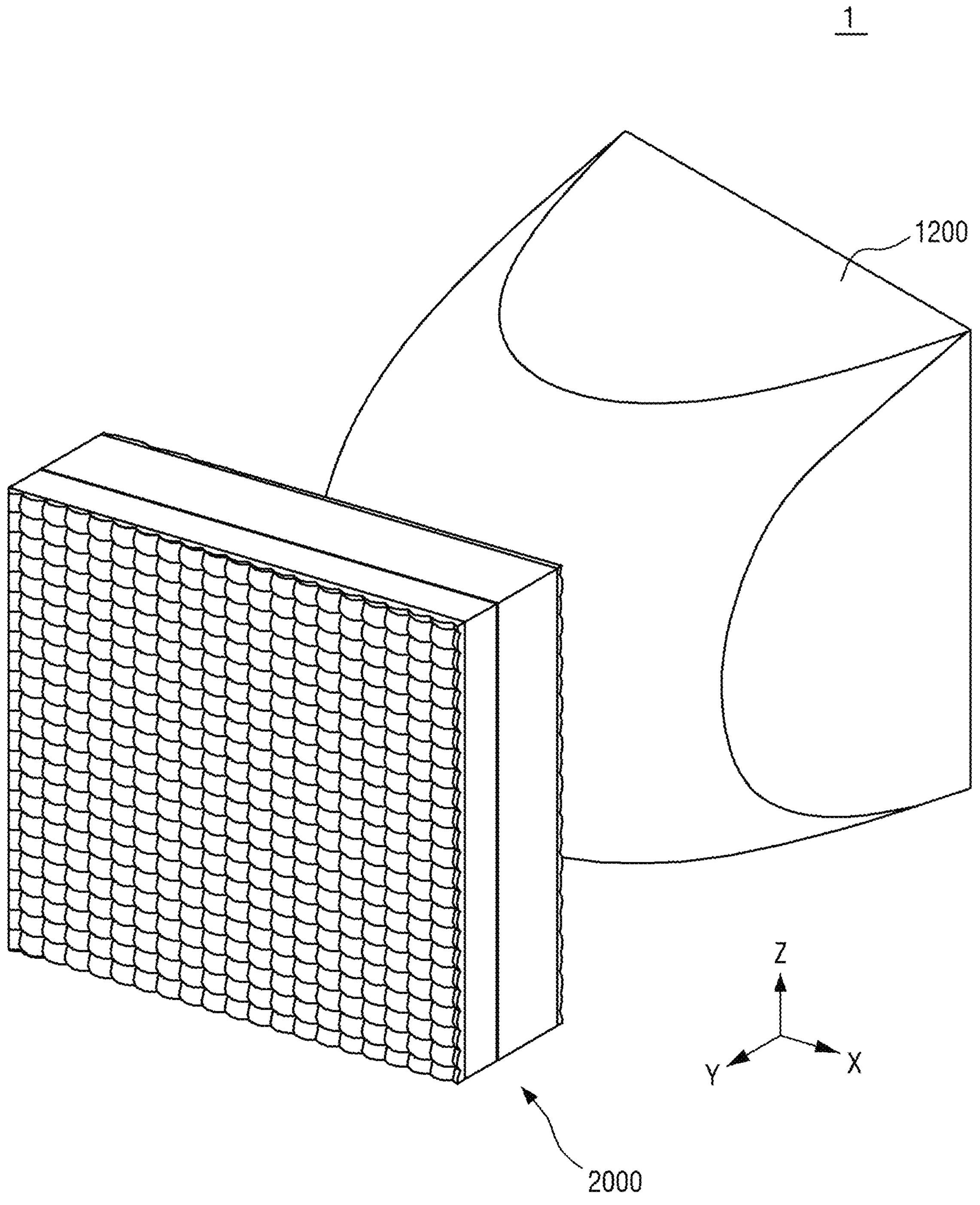
FIGS. 1 and 2 are perspective views illustrating a vehicle lamp according to an embodiment of the present disclosure.

The advantages and features of the present disclosure, and methods for achieving them, will become apparent with reference to embodiments to be described in detail below in conjunction with the accompanying drawings. However, the present disclosure is not limited to these embodiments but may be implemented in various different forms. These embodiments are provided merely to complete the present disclosure and to fully convey the scope of the disclosure to those skilled in the art, and the present disclosure is defined only by the scope of the claims. The same reference numerals denote the same components throughout the specification.

Accordingly, in some embodiments, well-known process steps, well-known structures, and well-known technologies are not described in detail to avoid obscuring the interpretation of the present disclosure.

The terminology used in this specification is for the purpose of describing embodiments only and is not intended to limit the present disclosure. As used in the specification, the singular forms also include the plural forms unless the context clearly indicates otherwise. The terms "comprises" and/or "comprising," as used herein, specify the presence of stated components, steps, operations, and/or elements but do not preclude the presence or addition of one or more other components, steps, operations, and/or elements. Further, "and/or" includes any and all combinations of one or more of the associated items.

In addition, the embodiments set forth in this specification will be explained with reference to cross-sectional and/or schematic views, which are ideal illustrations of the present disclosure. Therefore, the shapes in the drawings may be modified by manufacturing techniques and/or tolerances. Accordingly, the embodiments of the present disclosure are not limited to the specifically illustrated configurations, but include changes in shape that may occur during the manufacturing process. Also, in the accompanying drawings, the sizes of individual components may be exaggerated or reduced for clarity. The same reference numerals denote the same components throughout the specification.

The present disclosure will hereinafter be described with reference to the accompanying drawings for explaining a vehicle lamp according to some embodiments of the present disclosure.

Figure 2:
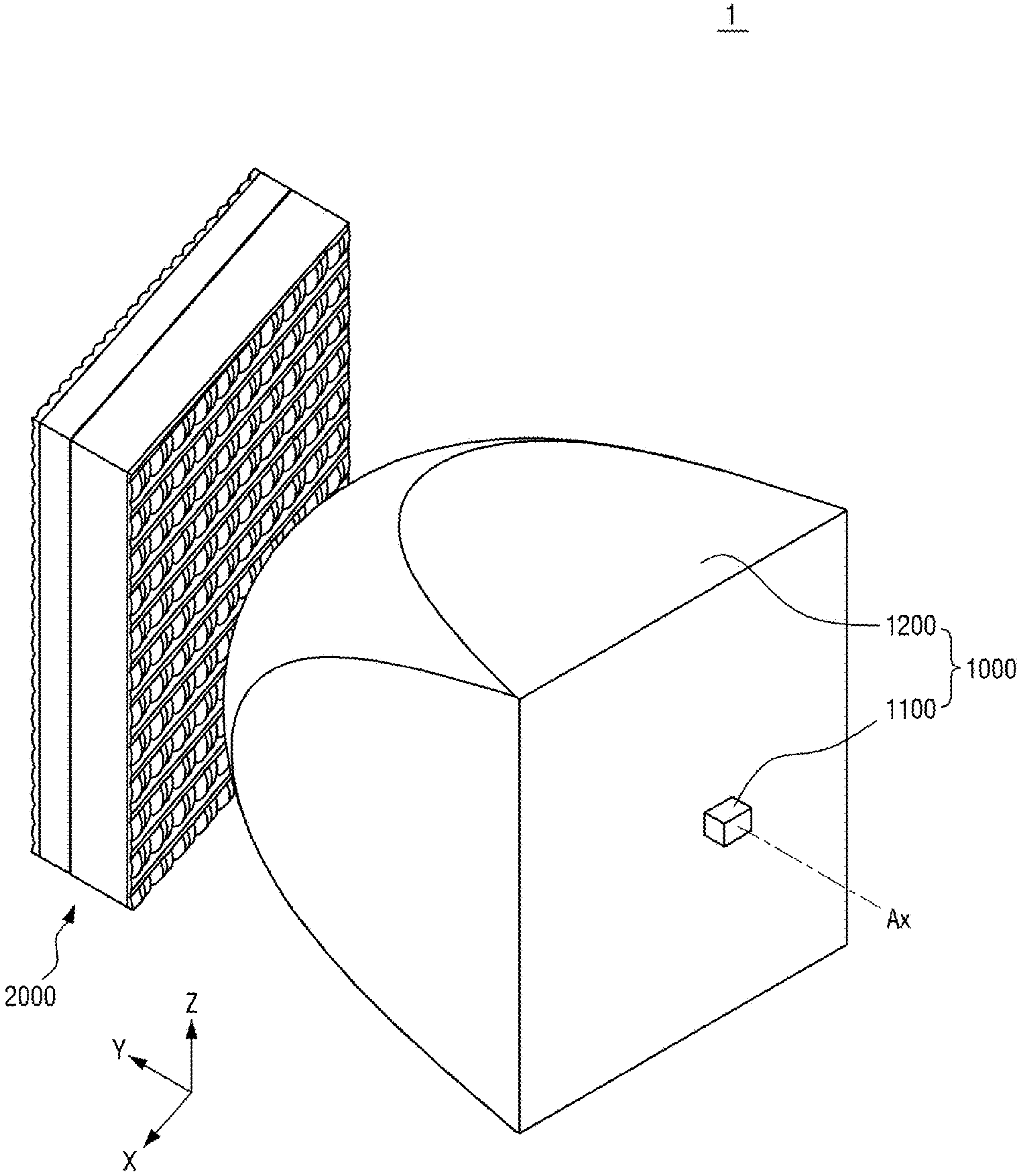
Figure 3:
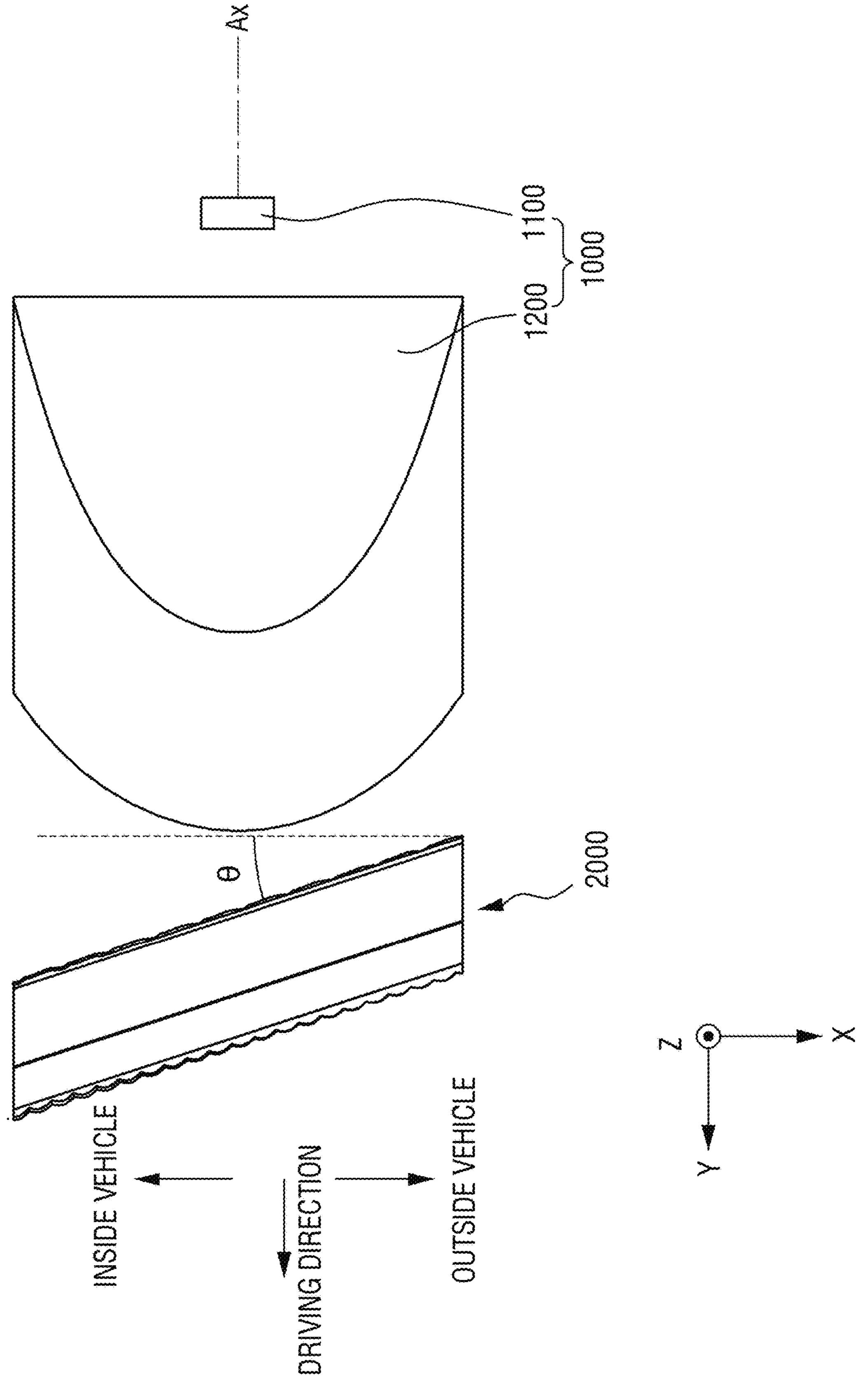
FIG. 3 is a plan view illustrating the vehicle lamp according to an embodiment of the present disclosure.

FIGS. 1 and 2 are perspective views illustrating a vehicle lamp according to an embodiment of the present disclosure, and FIG. 3 is a plan view illustrating the vehicle lamp according to an embodiment of the present disclosure. Referring to FIGS. 1 through 3, a vehicle lamp 1 according to an embodiment of the present disclosure may include a light source unit 1000 and an optical unit 2000.

In this embodiment, the vehicle lamp 1 may be used as a headlamp that irradiates or illuminates light in the proceeding direction of a vehicle when operating in low-light conditions such as at night so that the driver's forward visibility is ensured. However, the vehicle lamp 1 is not limited to a headlamp and may be used as other various types of lamps that can be installed in a vehicle, such as a tail lamp, brake lamp, fog lamp, position lamp, turn signal lamp, daytime running lamp, or backup lamp.

When the vehicle lamp 1 is used as a headlamp, it may form at least one of a low beam pattern or a high beam pattern. Low beam pattern may irradiate light below a predetermined cut-off line so as not to cause glare to the drivers of preceding or oncoming vehicles and thereby ensures a wider field of view for the front close range of the vehicle. High beam pattern may irradiate light above the low beam pattern to ensure a more distant field of view for the front long range of the vehicle.

Figure 4:
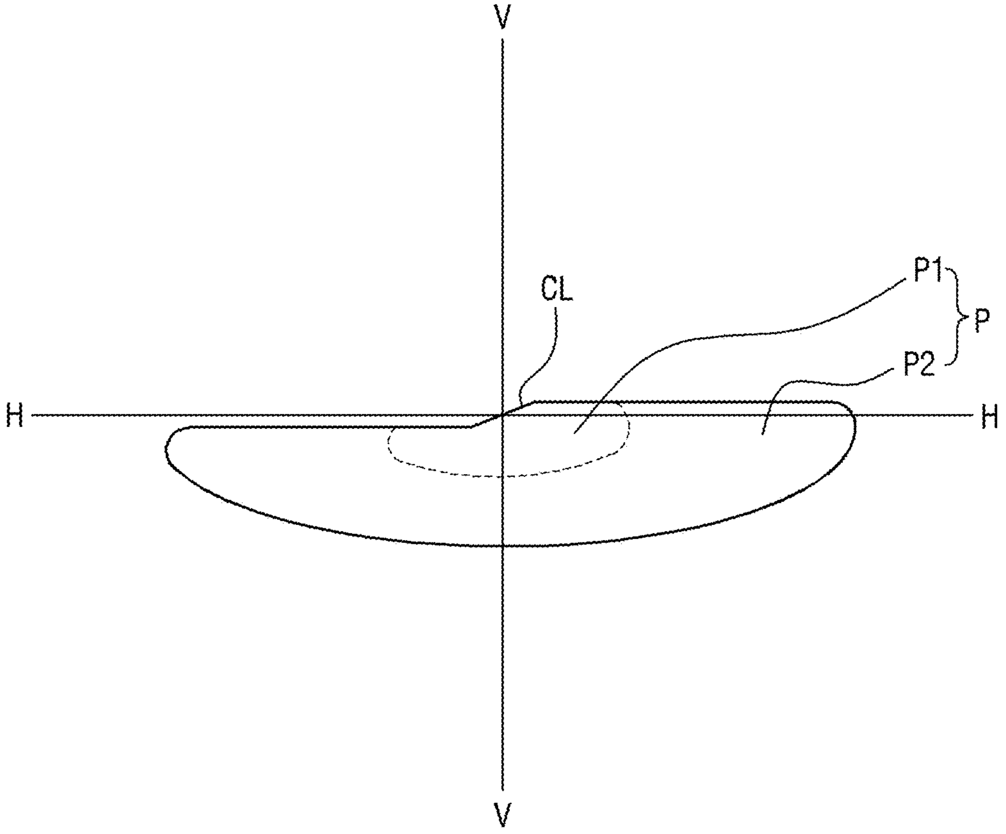
FIG. 4 is a schematic view illustrating a beam pattern formed by the vehicle lamp according to an embodiment of the present disclosure.

In this embodiment, the vehicle lamp 1 may form a low beam pattern P having a predetermined cut-off line CL, as illustrated in FIG. 4. The low beam pattern P may include a high-illuminance region P1 with relatively high brightness for improved visibility range, and a spread region P2 that has lower brightness than the high-illuminance region P1 and is formed to extend in at least one of vertical or horizontal direction relative to the high-illuminance region P1 in order to ensure a wider field of view in front of the vehicle.

The light source unit 1000 may include a light source 1100 and a light path adjustment unit 1200. The light source 1100 may generate and emit light having a suitable light amount and/or color for the purpose of the vehicle lamp 1. In this embodiment, a semiconductor light-emitting element such as a light-emitting diode (LED) may be used as the light source 1100. However, the light source 1100 is not limited thereto and may include other various types of light sources such as a laser diode (LD) or a bulb.

The light path adjustment unit 1200 may convert the light emitted from the light source 1100 within a predetermined emission angle range relative to an optical axis Ax perpendicular to the center of the light-emitting surface of the light source 1100 into substantially parallel light that is aligned with the optical axis Ax. The light path adjustment unit 1200 may make the light emitted from the light source 1100 uniformly incident on the entire optical unit 2000, thereby allowing the beam pattern to be formed by the vehicle lamp 1 to have a more uniform brightness overall.

In this embodiment, an aspherical lens may be used as the light path adjustment unit 1200, but this is merely exemplary to aid understanding of the present disclosure and is not limiting. That is, the light path adjustment unit 1200 may include other various types of lenses such as a Fresnel lens or total internal reflection (TIR) lens that converts light emitted from the light source 1100 into parallel light.

In addition, in this embodiment, the light path adjustment unit 1200 may be arranged such that the optical axis Ax of the light source 1100 may pass through the center of the light path adjustment unit 1200, and thus the optical axis Ax of the light source 1100 may be understood as the optical axis of the light source unit 1000.

The optical unit 2000 may allow at least a portion of the light incident from the light source unit 1000 to be emitted, so that a beam pattern suitable for the purpose of the vehicle lamp 1 may be formed.

In this embodiment, the optical unit 2000 may be tilted at a predetermined angle θ such that one side in a left-right direction may be disposed more rearward relative to the other side. This configuration is to allow the optical unit 2000 to be installed in accordance with the vehicle's body line (e.g., body contour).

In other words, the vehicle lamp 1 may be accommodated in a space formed by a lamp housing and an outer lens coupled to the lamp housing, and the optical system of the vehicle lamp 1 may be installed conforming to the shape of the outer surface of the outer lens that forms part of the vehicle's body line.

For example, if the outer surface of the outer lens is inclined or curved rearward from the inside toward the outside of the vehicle in the left-right direction, the optical unit 2000 may also be understood to be installed in a tilted manner such that it may be disposed more rearward going from the inside toward the outside of the vehicle, as illustrated in FIG. 3.

In this embodiment, the optical unit 2000 may be disposed such that the outer side thereof may be disposed more rearward relative to the inner side in the left-right direction. However, the present disclosure is not limited to this case, and the opposite case may also be possible.

In this manner, the optical unit 2000 may be installed in a tilted manner according to the vehicle's body line because, when the outer lens is formed to be disposed rearward going from the inner to the outer side of the vehicle and the surface from which the light is emitted from the optical unit 2000 is installed to face directly forward of the vehicle, one end of the optical unit 2000 may be blocked by the vehicle body or the periphery of the outer lens, which may not only degrade the exterior design but also cause part of the light emitted from the optical unit 2000 to be blocked, resulting in an abnormal beam pattern or light loss.

Figure 5:
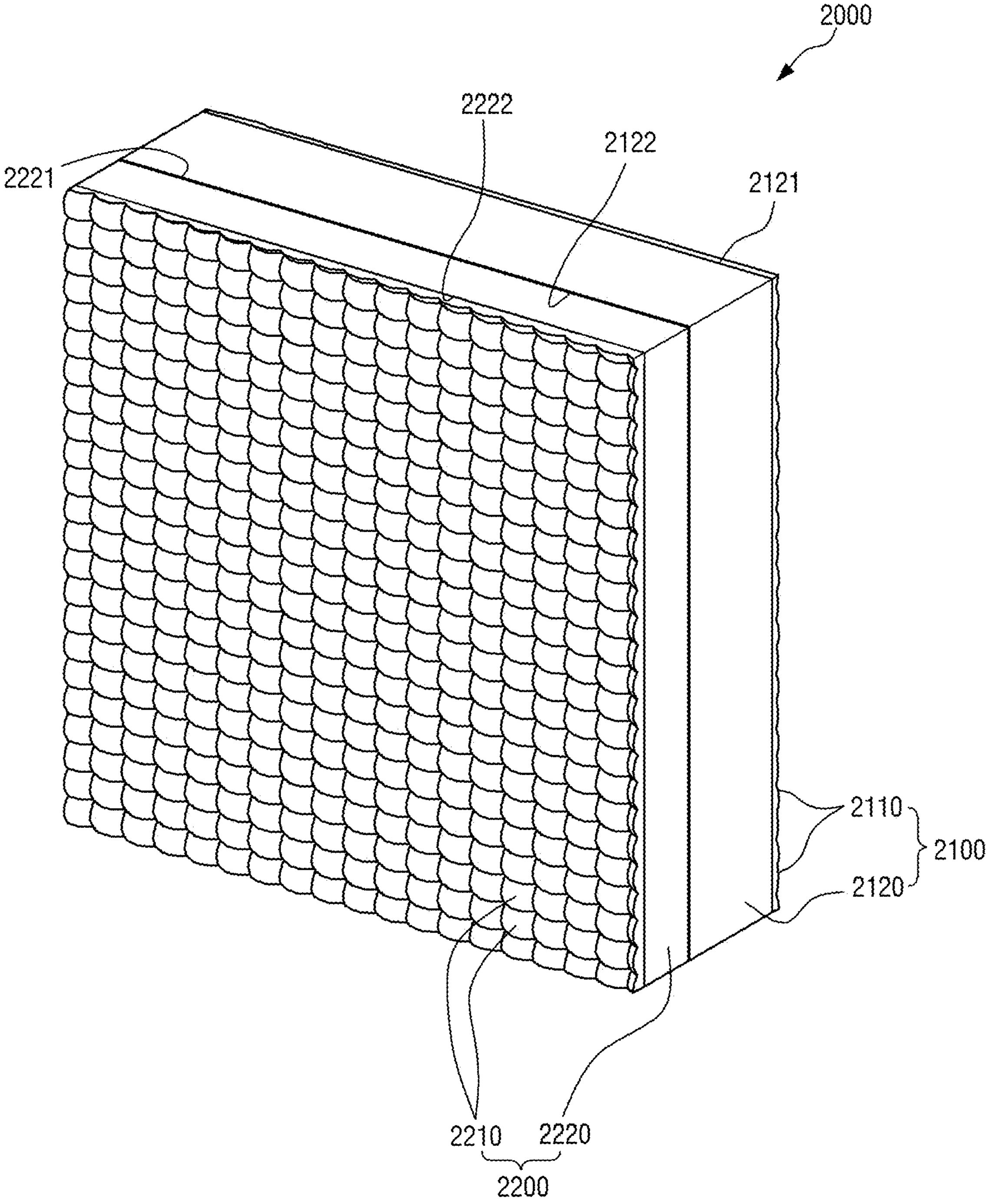
FIGS. 5 and 6 are perspective views illustrating an optical unit according to an embodiment of the present disclosure.
Figure 6:
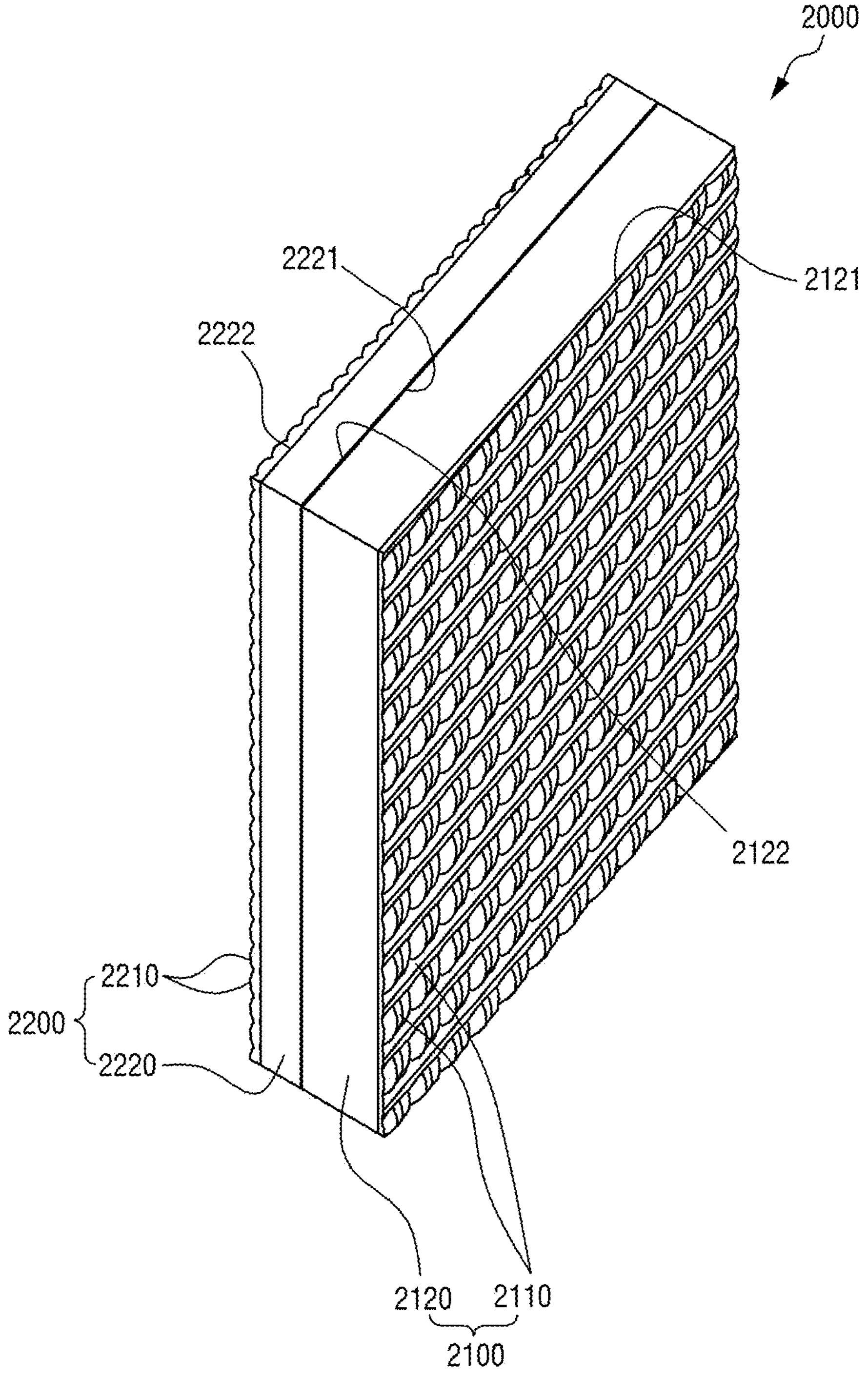
Figure 7:
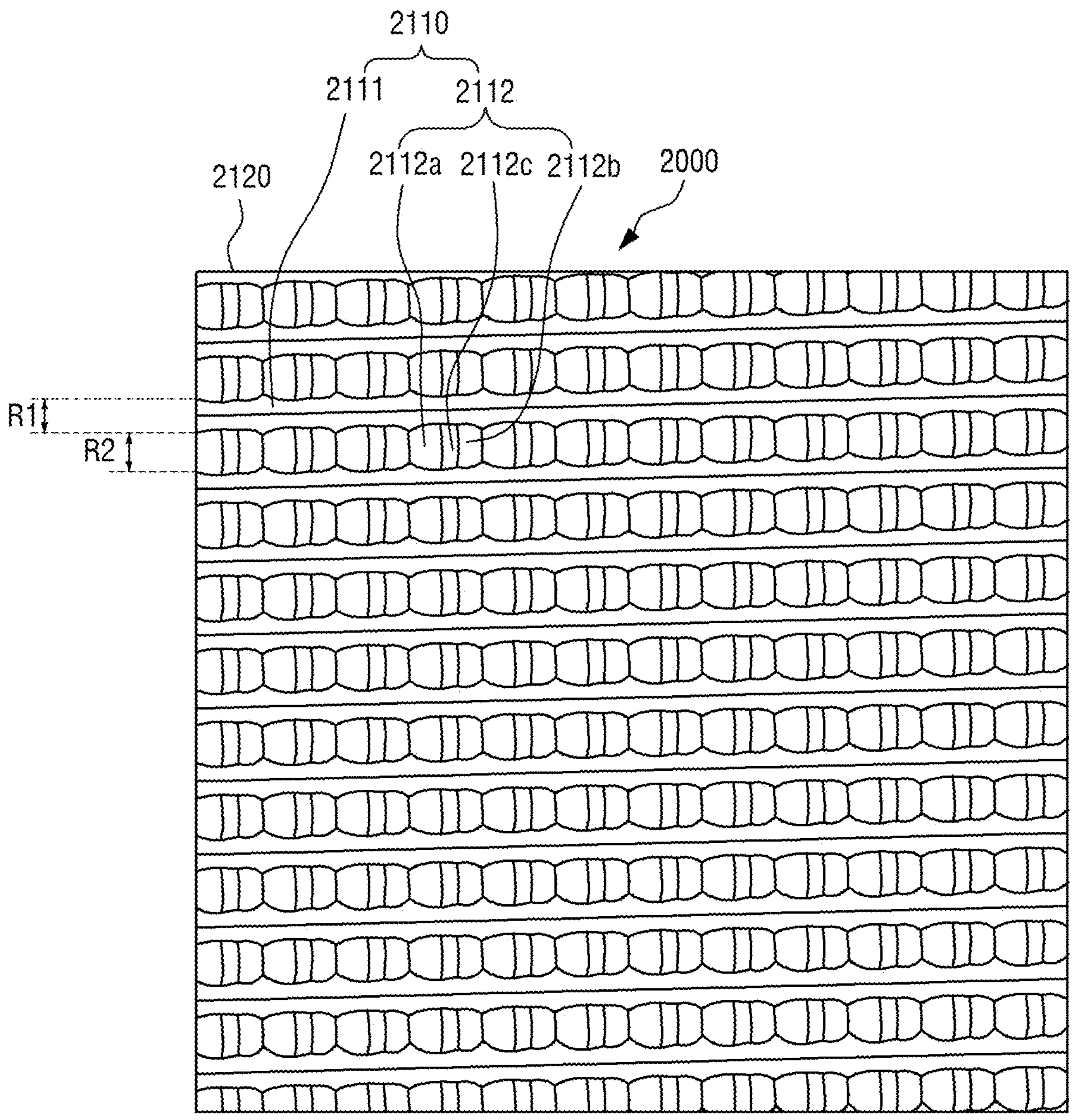
FIG. 7 is a rear view illustrating the optical unit according to an embodiment of the present disclosure.
Figure 8:
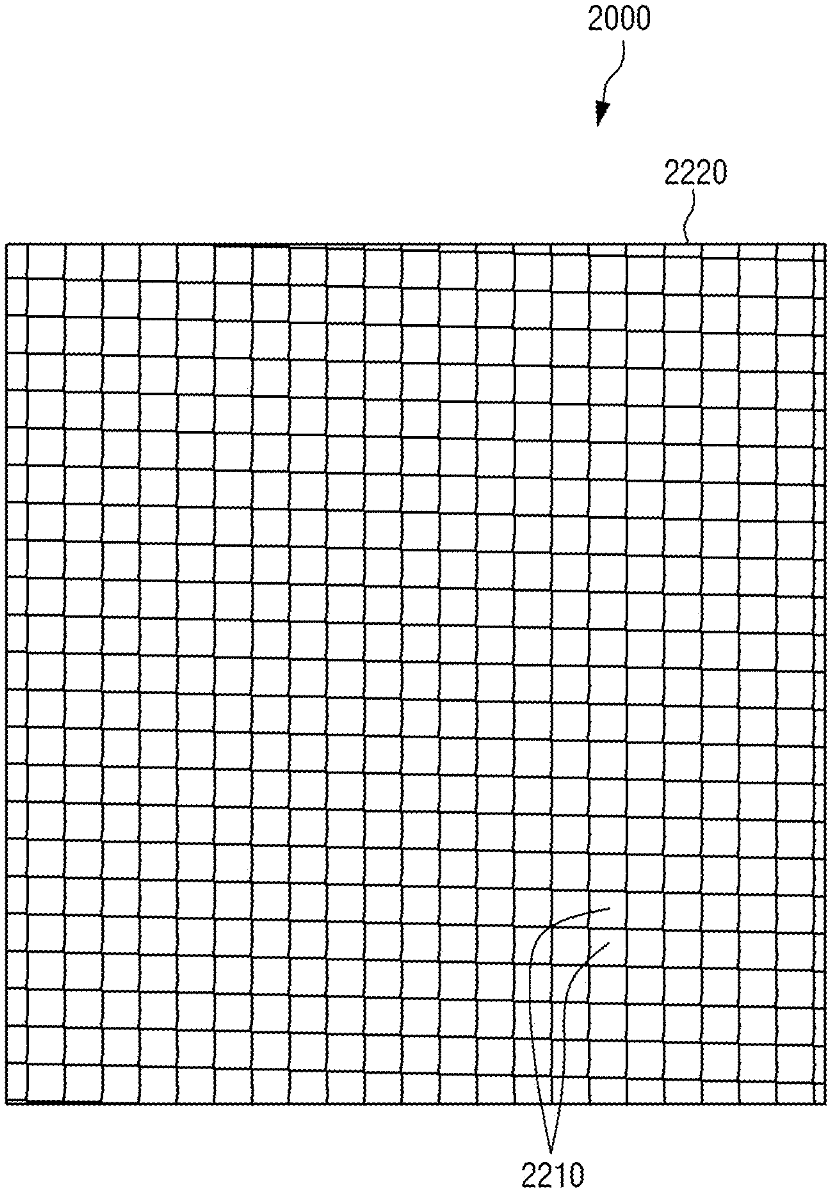
FIG. 8 is a front view illustrating the optical unit according to an embodiment of the present disclosure.

FIGS. 5 and 6 are perspective views illustrating an optical unit according to an embodiment of the present disclosure, FIG. 7 is a rear view illustrating the optical unit according to an embodiment of the present disclosure, and FIG. 8 is a front view illustrating the optical unit according to an embodiment of the present disclosure. Referring to FIGS. 5 through 8, an optical unit 2000 according to an embodiment of the present disclosure may include an incident lens unit 2100 and an emission lens unit 2200.

The incident lens unit 2100 may include a plurality of incident lenses 2110 and a first light transmission portion 2120, and the emission lens unit 2200 may include a plurality of emission lenses 2210 and a second light transmission portion 2220. In this embodiment, for miniaturization of the vehicle lamp 1, microlenses having relatively short focal lengths may be used as the incident lenses 2110 and the emission lenses 2210.

The incident lenses 2110 may be disposed on an incident surface 2121 of the first light transmission portion 2120, and the emission lenses 2210 may be disposed on an emission surface 2222 of the second light transmission portion 2220. In this case, the emission surface 2122 of the first light transmission portion 2120 and the incident surface 2221 of the second light transmission portion 2220 may be disposed abut each other, so that the light incident through the incident lenses 2110 may be guided to the emission lenses 2210 by the first light transmission portion 2120 and the second light transmission portion 2220 and may then be emitted.

In this embodiment, the emission lenses 2210 may be formed thicker than the incident lenses 2110, and the first light transmission portion 2120 may be formed thicker than the second light transmission portion 2220. This configuration is to allow the emission lenses 2210 to have relatively shorter focal lengths, considering that a shorter focal length improves spread characteristics. The interface at which the emission surface 2122 of the first light transmission portion 2120 and the incident surface 2221 of the second light transmission portion 2220 contact each other may be understood as a focal plane on which the focal points of the emission lenses 2210 are disposed.

Figure 9:
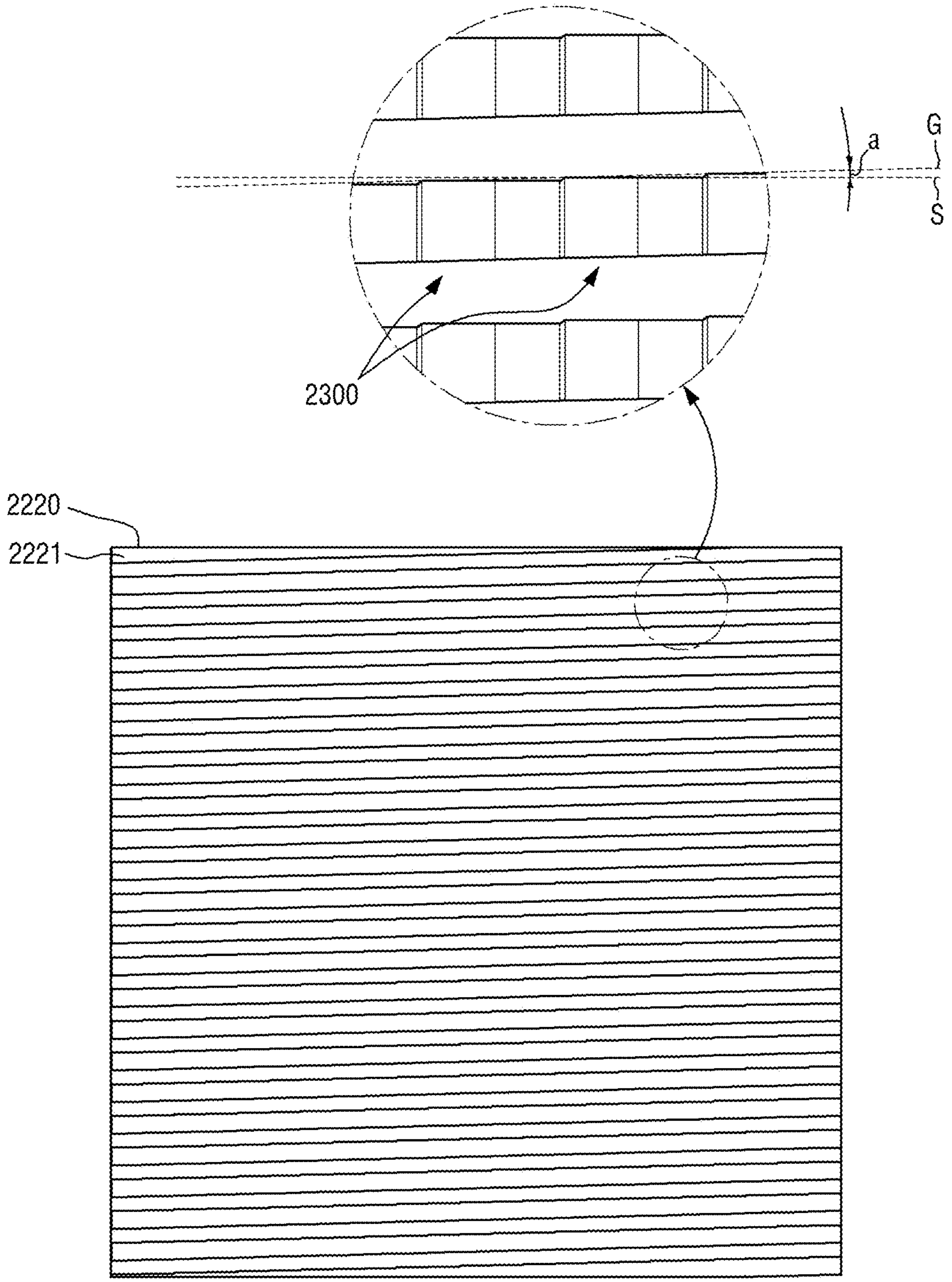
FIG. 9 is a schematic view illustrating a plurality of shields according to an embodiment of the present disclosure.

In this case, as illustrated in FIG. 9, a plurality of shields 2300, which are configured to block part of the light proceeding toward the corresponding emission lenses 2210, may be formed on either the emission surface 2122 of the first light transmission portion 2120 or the incident surface 2221 of the second light transmission portion 2220 by deposition, coating, or the like. The shields 2300 may serve to form a low beam pattern in which light is irradiated below a predetermined cut-off line by the vehicle lamp 1. Depending on the beam pattern to be formed by the vehicle lamp 1, the shape, size, and position of the shields 2300 may vary, or the shields 2300 may be omitted.

Rows, in each of which the shields 2300 extend in the left-right direction, may be arranged in an up-down direction, and the rows may be obliquely arranged at a predetermined angle a with respect to a horizontal line S such that no step difference may occur between adjacent shields 2300 in the left-right direction. In other words, the oblique arrangement of the rows where the shields 2300 extend in the left-right direction may mean that a line G that connects corresponding points in a row of shields 2300 that are arranged in the left-right direction is inclined at the predetermined angle a with respect to the horizontal line S.

Figure 10:
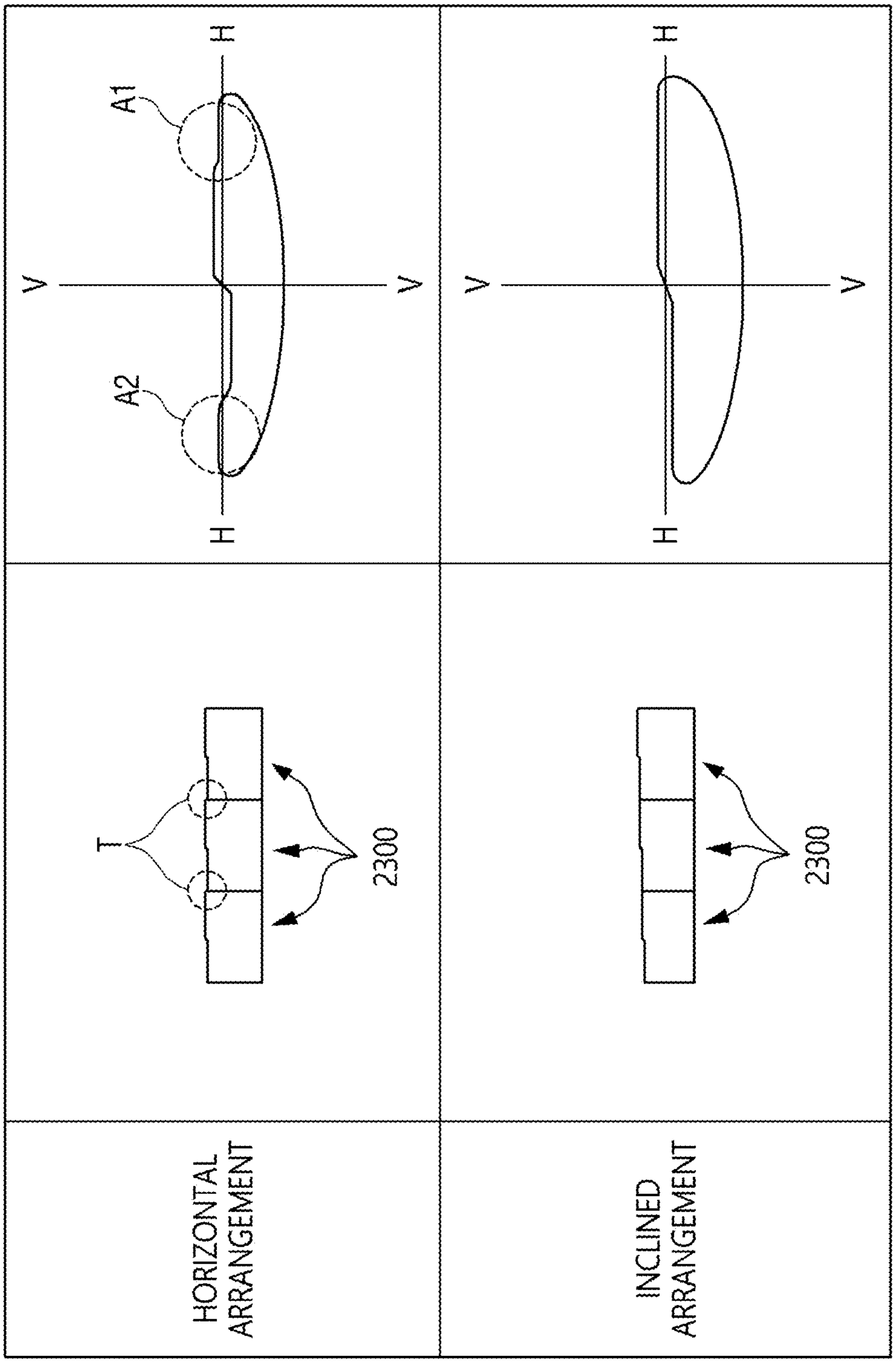
FIG. 10 is a schematic view illustrating beam patterns formed depending on the positions of adjacent shields among the plurality of shields according to an embodiment of the present disclosure.

Here, referring to FIG. 10, the oblique arrangement of the rows where the shields 2300 extend in the left-right direction at the predetermined angle a is to prevent step differences T (e.g., a height difference) between adjacent shields 2300 in the left-right direction, which may cause portions A1 and A2 of the cut-off line CL of the low beam pattern P to rise or fall relative to their intended positions, leading to reduced driver visibility or glare for the driver of a vehicle ahead.

A plurality of lens rows (e.g., R1 and R2 in FIG. 7) in which the incident lenses 2110 extend in the left-right direction may be arranged in the up-down direction. Since the rows where the shields 2300 extend in the left-right direction are inclined at the predetermined angle a, the lens rows (R1 and R2) may each extend obliquely with respect to the horizontal line S such that one side in the left-right direction may be disposed vertically higher than the other side.

The lens rows (R1 and R2) may include first lens rows R1 and second lens rows R2. In this embodiment, the first lens rows R1 and the second lens rows R2 may be alternately arranged in the up-down direction. The alternate arrangement of the first lens rows R1 and the second lens rows R2 is to make the image formed by the light emitted from the vehicle lamp 1 have a more uniform brightness overall.

For example, if the first lens rows R1 are exclusively formed in the upper part in the up-down direction and the second lens rows R2 are exclusively formed in the lower part of the optical unit 2000, differences in a light emission image or brightness may occur due to differences in emission characteristics between the first lens rows R1 and the second lens rows R2. In this case, differences in a light emission image or brightness may occur in different regions within the image formed by the light emitted from the vehicle lamp 1, resulting in a sense of heterogeneity and reduced visibility. Therefore, by alternately arranging the first lens rows R1 and the second lens rows R2, the sense of heterogeneity can be reduced, and visibility can be improved by achieving overall uniform brightness.

In this embodiment, the first lens rows R1 and the second lens rows R2 may be alternately arranged one by one, but this is merely exemplary to aid understanding of the present disclosure, and is not limiting. Alternatively the first lens rows R1 and/or the second lens rows R2 may be repeated more than once in all or some portions of the optical unit 2000.

The incident lenses 2110 may include first incident lenses 2111 that forms the first lens rows R1 and second incident lenses 2112 that forms the second lens rows R2.

The first incident lenses 2111 may exhibit a semicylindrical shape having a curvature such that the light incident from the light source unit 1000 may be condensed in the up-down direction. It may extend longitudinally in the left-right direction such that the incident light may proceed as parallel light in terms of the left-right direction.

In this embodiment, the first lens rows R1 may be formed by incident lenses of a single type, i.e., the first incident lenses, but this is merely exemplary to aid understanding of the present disclosure and is not limiting. The first lens rows R1 may each be formed by two or more first incident lenses 2111, and depending on the number of first incident lenses 2111 forming each of the first lens rows R1, the first incident lenses 2111 may correspond one-to-one, one-to-many, many-to-one, or many-to-many to the emission lenses 2210.

Figure 11:
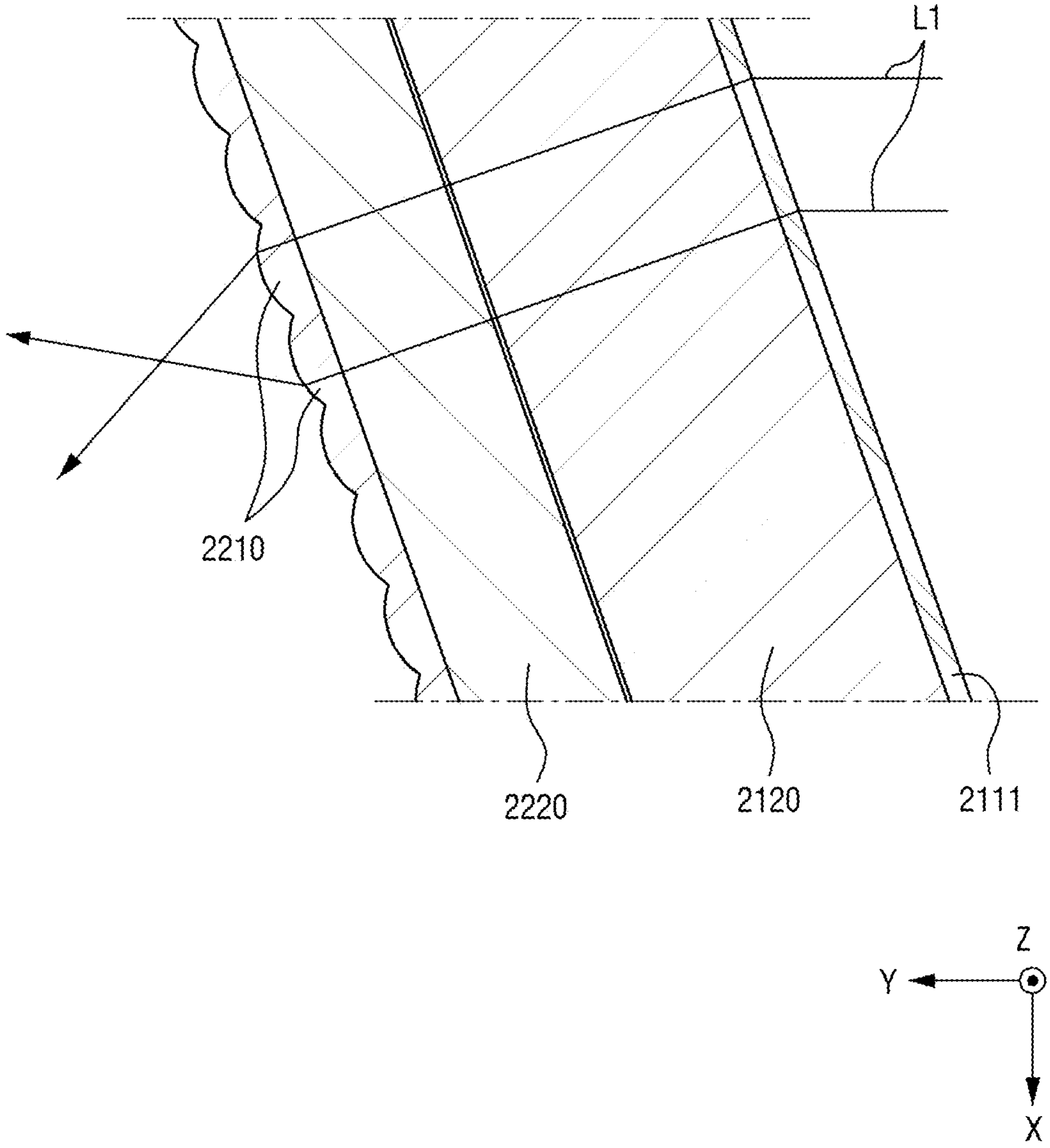
FIG. 11 is a schematic view illustrating light paths by first incident lenses according to an embodiment of the present disclosure.

FIG. 11 is a schematic view illustrating light paths by first incident lenses according to an embodiment of the present disclosure. Referring to FIG. 11, light L1 incident through first incident lenses 2111 according to an embodiment of the present disclosure may be incident to the corresponding emission lenses 2210 and spread in the left-right direction, so that a spread region that satisfies the required light distribution characteristics by the vehicle lamp 1, such as size, position, shape, and brightness of the area where light is irradiated, may be formed.

In this case, the first incident lenses 2111 may refract light in a direction toward a side of the optical unit 2000 that is disposed more rearward, depending on a tilt angle θ of the optical unit 2000, so that the light may proceed as parallel light. At least a portion of the light L1 incident to the first incident lenses 2111 may be emitted through the corresponding emission lenses 2210 and spread in the left-right direction, so that the spread region of the beam pattern may be formed by the vehicle lamp 1.

The second incident lenses 2112 may serve to enhance the high-illuminance region P1 and the spread region P2 of the low beam pattern P formed by the vehicle lamp 1. In this embodiment, the second lens rows R2 may each be formed by two or more second incident lenses 2112 arranged in the left-right direction.

Figure 12:
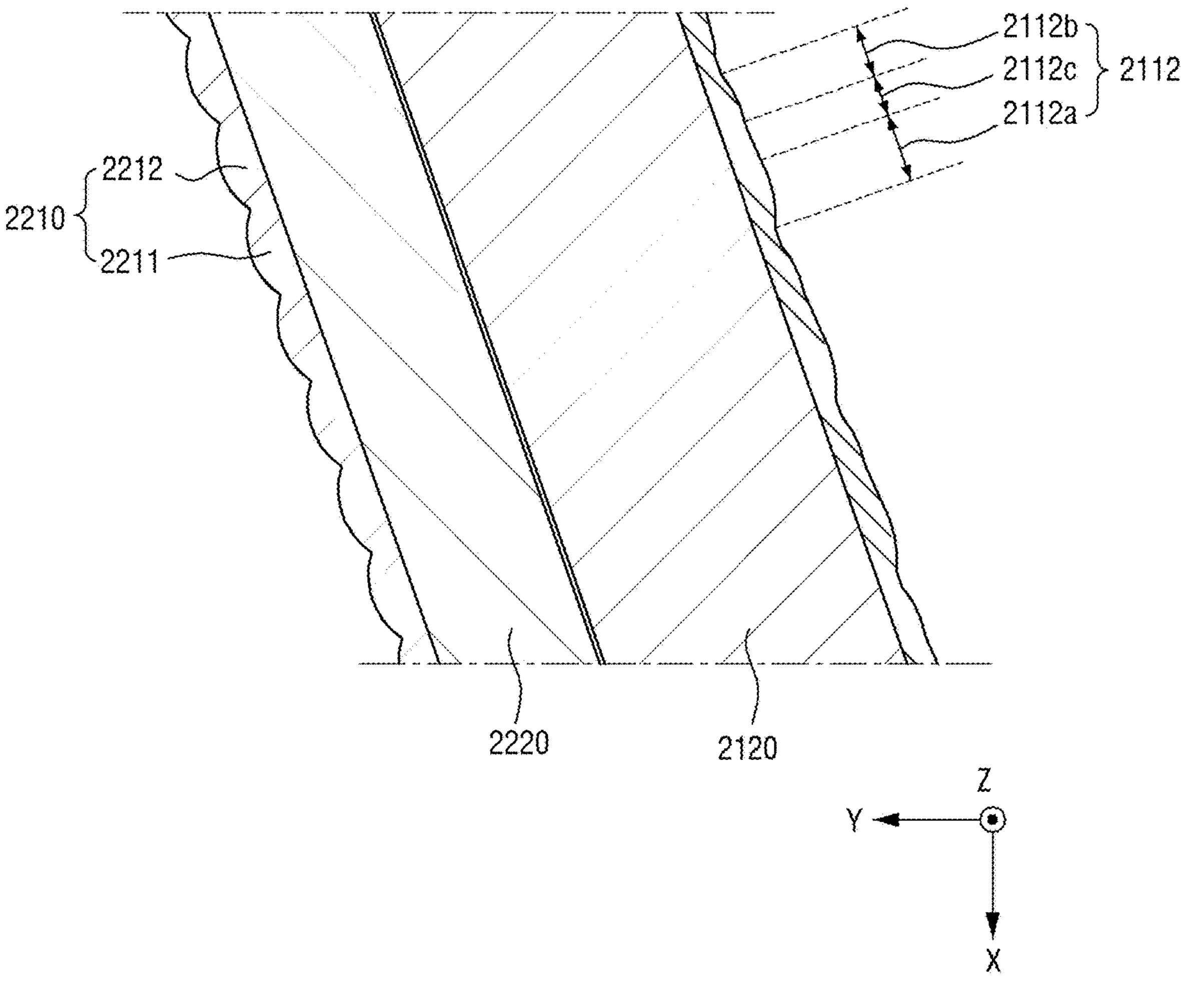
FIG. 12 is a cross-sectional view illustrating second incident lenses and corresponding emission lenses according to an embodiment of the present disclosure.
Figure 13:
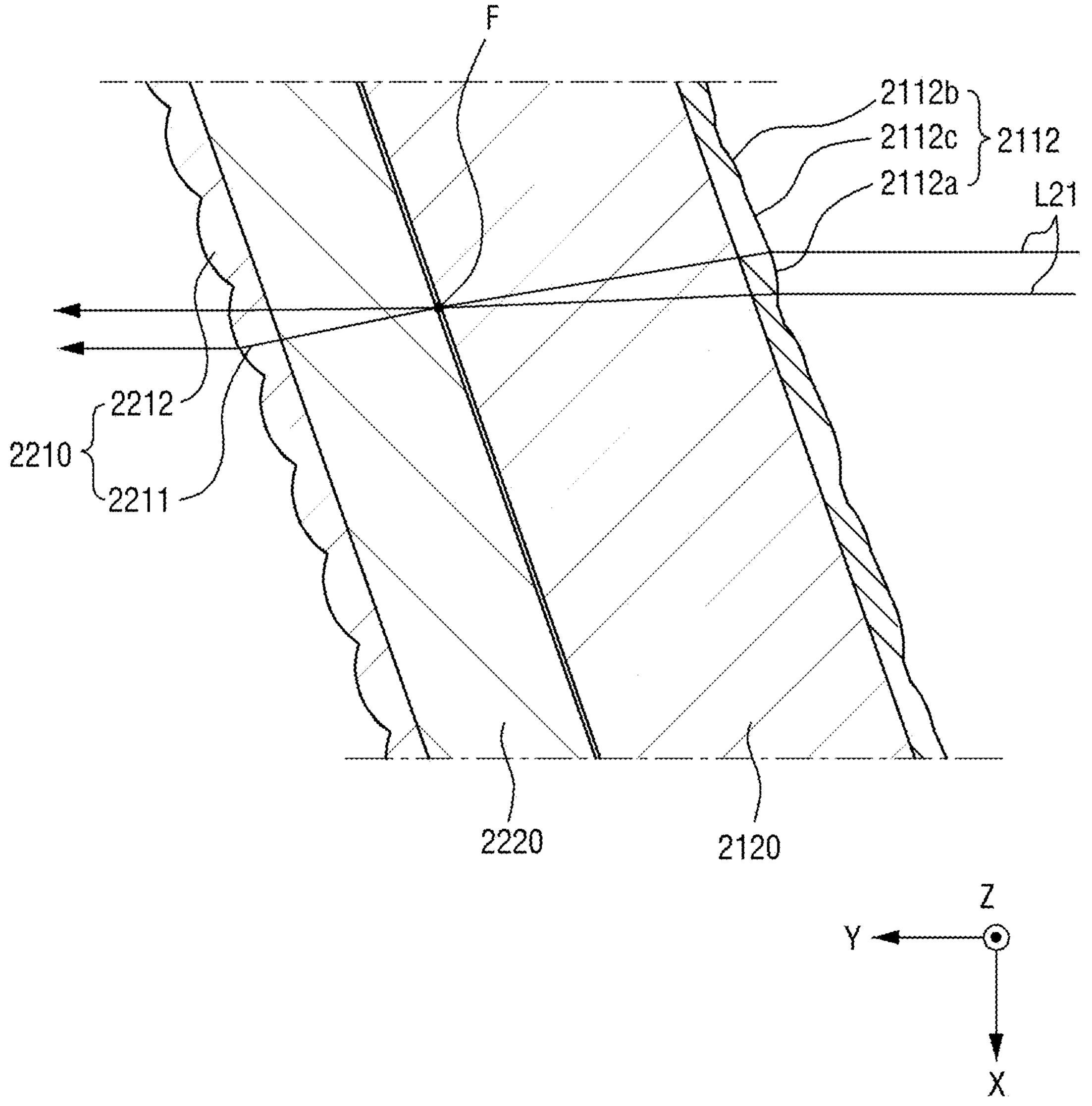
FIG. 13 is a schematic view illustrating light paths by first incident regions according to an embodiment of the present disclosure.
Figure 14:
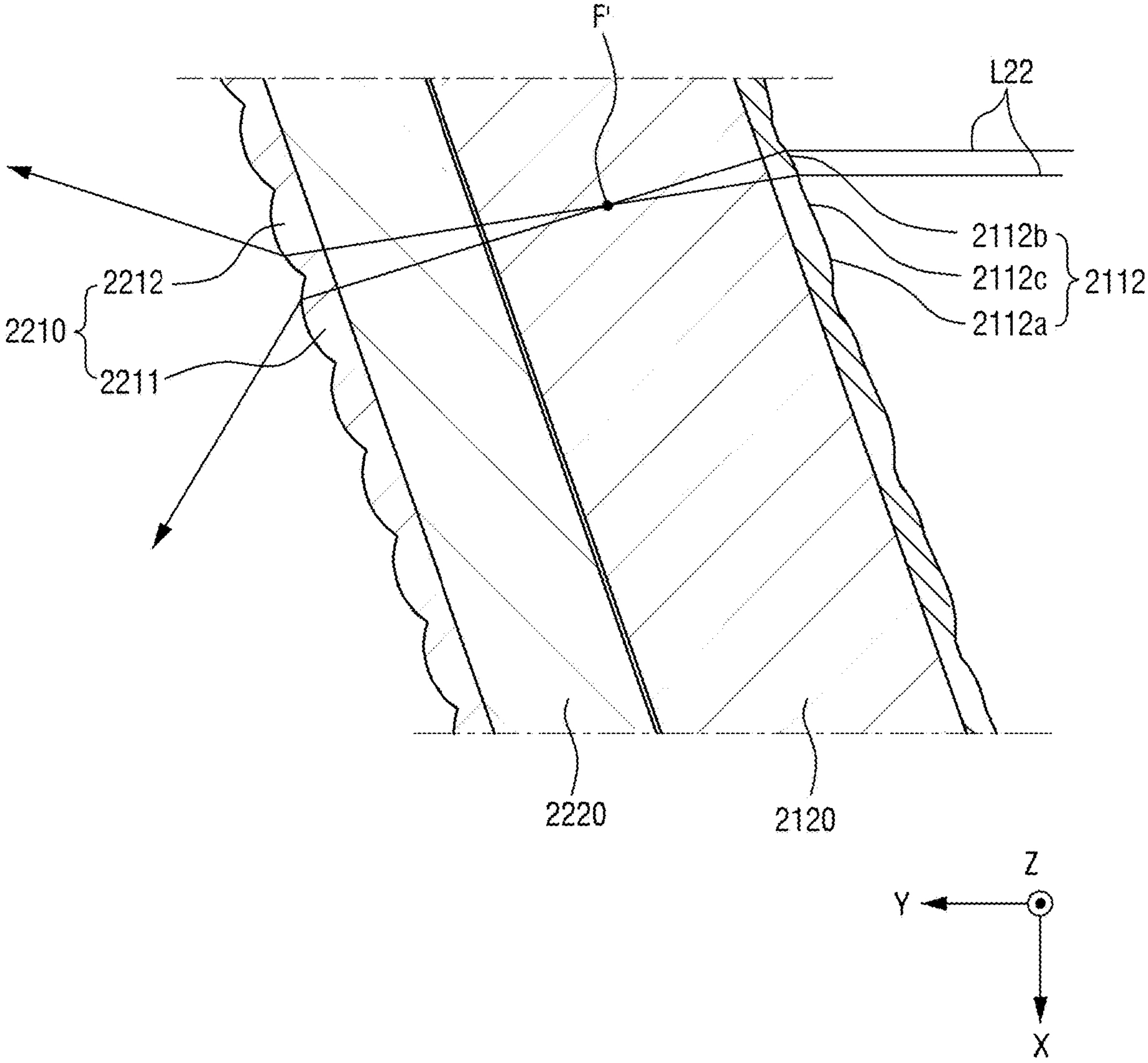
FIG. 14 is a schematic view illustrating light paths by second incident regions according to an embodiment of the present disclosure.
Figure 15:
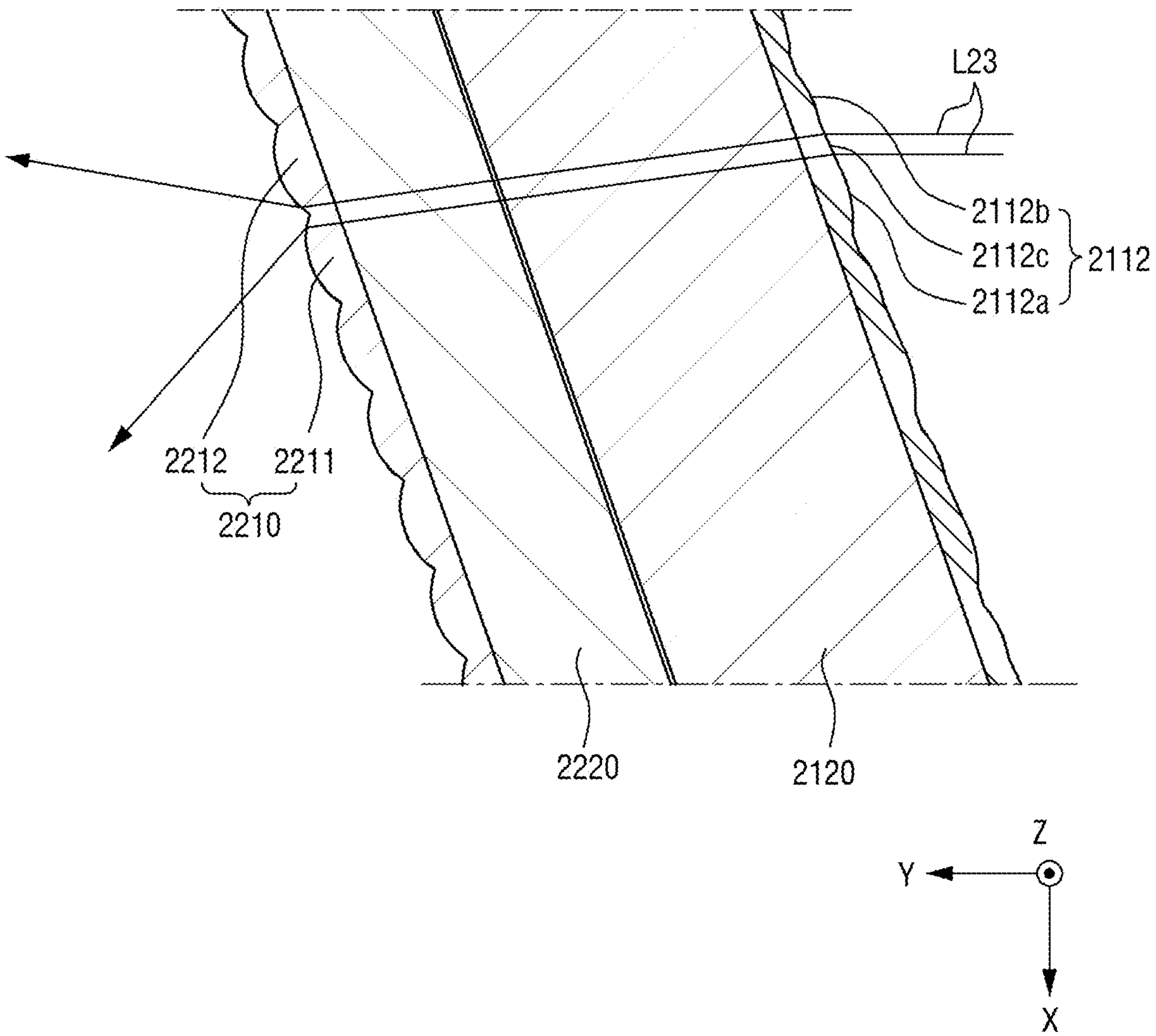
FIG. 15 is a schematic view illustrating light paths by third incident regions according to an embodiment of the present disclosure.

FIG. 12 is a cross-sectional view illustrating second incident lenses and corresponding emission lenses according to an embodiment of the present disclosure, FIG. 13 is a schematic view illustrating light paths by first incident regions according to an embodiment of the present disclosure, FIG. 14 is a schematic view illustrating light paths by second incident regions according to an embodiment of the present disclosure, and FIG. 15 is a schematic view illustrating light paths by third incident regions according to an embodiment of the present disclosure.

Referring to FIGS. 12 through 15, second incident lenses 2112 according to an embodiment of the present disclosure may each include a plurality of incident regions 2112*a*, 2112*b*, and 2112*c* having different light-concentrating powers, and may allow the light to be emitted through a corresponding pair of adjacent first and second emission lenses 2211 and 2212, among the plurality of emission lenses 2210.

In this embodiment, two emission lenses 2210, i.e., first and second emission lenses 2211 and 2212, may correspond to one second incident lens 2112, but the present disclosure is not limited thereto. The second incident lenses 2112 may correspond one-to-one, one-to-many, many-to-one, or many-to-many to the emission lenses 2210.

The incident regions 2112*a*, 2112*b*, and 2112*c* having different light-concentrating powers (e.g., light-condensing performances) may mean that the points at which light incident through the incident regions 2112*a*, 2112*b*, and 2112*c* is condensed (e.g., focused) differ in at least one direction. This description encompasses not only a case where the incident light is collimated but also a case where the incident light proceeds as parallel light.

The incident regions 2112*a*, 2112*b*, and 2112*c* may include a first incident region 2112*a*, a second incident region 2112*b*, and a third incident region 2112*c*.

Referring to FIG. 13, the first incident region 2112*a* may serve to allow light L21 incident from the light source unit 1000 to be condensed at or near a rear focal point F of either the corresponding first or second emission lens 2211 or 2212, so that the light may be emitted through the corresponding first or second emission lens 2211 or 2212, thereby reinforcing the high-illuminance region P1 of the low beam pattern P.

In other words, in this embodiment, since the optical unit 2000 is tilted with respect to the front direction, the light incident from the light source unit 1000 may be refracted as a whole toward the side of the optical unit 2000 that is disposed more rearward, which may cause the brightness of the high-illuminance region P1 of the low beam pattern P to be relatively reduced. Therefore, the light L21 incident through the first incident region 2112*a* may be emitted substantially parallel to the optical axis Ax of the light source 1100 to reinforce the high-illuminance region P1 of the low beam pattern P, thereby improving the brightness of the high-illuminance region P1 and enabling the beam pattern formed by the vehicle lamp 1 to sufficiently satisfy the required light distribution characteristics, including the position, brightness, shape, and size of the area where light is irradiated.

Referring to FIG. 14, the second incident region 2112*b* may serve to allow light L22 incident from the light source unit 1000 to be emitted through at least one of the corresponding first or second emission lens 2211 and 2212 and to spread relatively broadly in the left-right direction, thereby expanding the spread region P2 of the low beam pattern P and enhancing the spread characteristics.

Referring to FIG. 14, the light L22 incident through the second incident region 2112*b* may be collimated at a point F' disposed behind (toward the light source side) the interface where the emission surface 2122 of the first light transmission portion 2120 and the incident surface 2221 of the second light transmission portion 2220 are in contact. As a result, a portion of the light L22 incident through the second incident region 2112*b* may be emitted through the corresponding first emission lens 2211, and another portion of the light L22 may be emitted through the corresponding second emission lens 2212. These portions of the light L22 may spread more widely in opposite directions, expanding both lateral sides of the spread region P2 of the low beam pattern P and increasing the overall width of the low beam pattern P in the left-right direction. Thus, a wider field of view may be secured for the front near-field of the vehicle.

In this case, the second incident region 2112*b* may be formed to have a smaller width in the left-right direction than the first incident region 2112*a*. This condition may be understood as a design consideration to ensure a sufficiently high brightness for the high-illuminance region P1.

Referring to FIG. 15, similarly to the first incident lens 2111, the third incident region 2112*c* may serve to allow light L23 incident from the light source unit 1000 to proceed as substantially parallel light so as to form the spread region P2 of the low beam pattern P. In this embodiment, the spread region P2 of the low beam pattern P may be formed by the third incident region 2112*c* together with the first incident lens 2111, but the present disclosure is not limited thereto. Alternatively, if the spread region formed by the first incident lens 2111 sufficiently satisfies the required light distribution characteristics, the third incident region 2112*c* may be omitted, and the first and second incident regions 2112*a* and 2112*b* may be formed to be directly adjacent with each other.

The propagation direction of the light incident through each of the first, second, and third incident regions 2112*a*, 2112*b*, and 2112*c* as described above may vary depending on the shape, curvature, or the like of each of the first, second, and third incident regions 2112*a*, 2112*b*, and 2112*c*.

Figure 16:
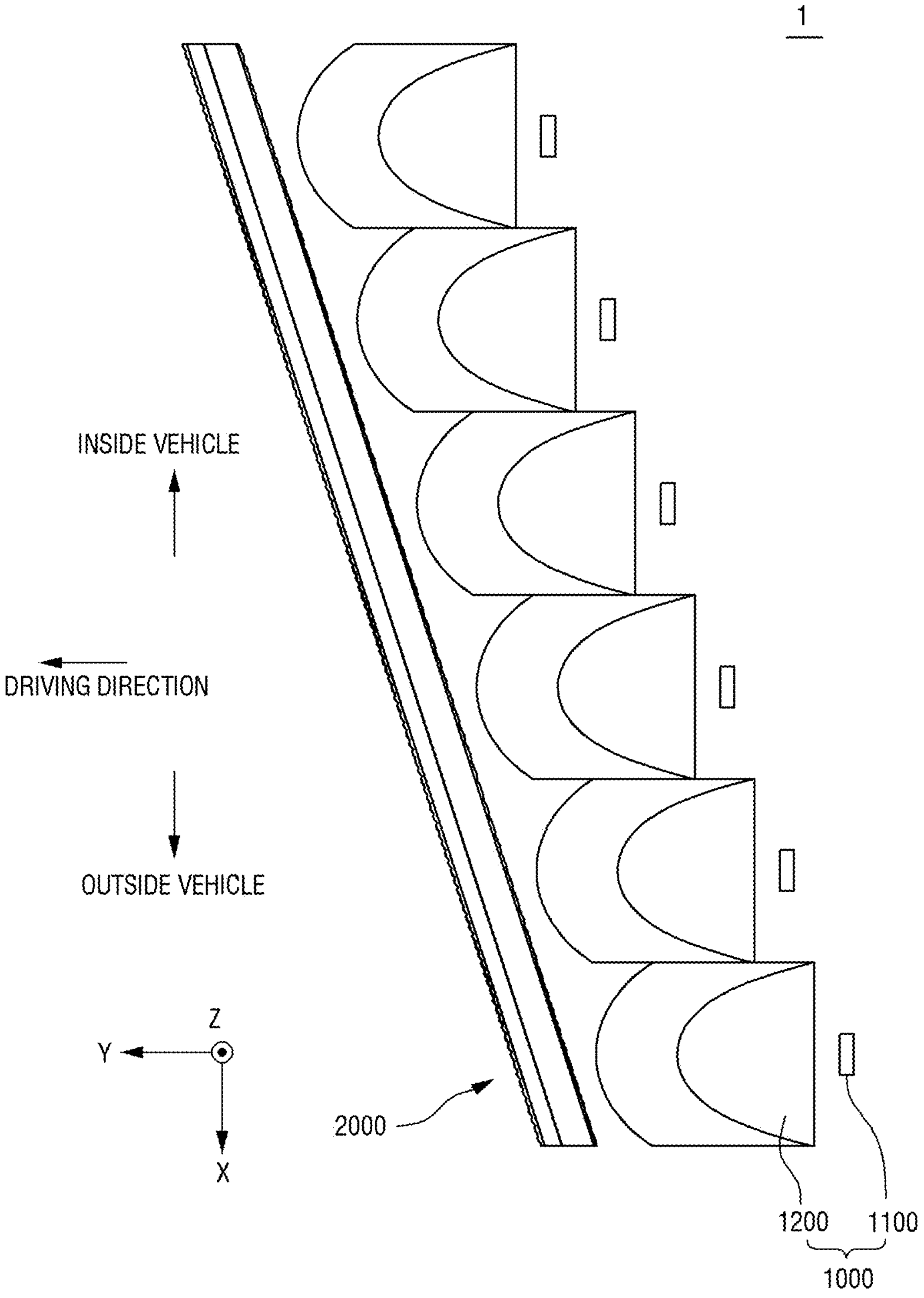
FIG. 16 is a plan view illustrating a vehicle lamp according to another embodiment of the present disclosure.

Meanwhile, the vehicle lamp 1 has been described as including a single light source unit 1000 and a single optical unit 2000, but the present disclosure is not limited thereto. Alternatively, depending on the layout or design of the vehicle lamp 1, the vehicle lamp 1 may include a plurality of light source units 1000 and a plurality of optical units 2000 arranged in one direction, as illustrated in FIG. 16. In this case, the plurality of light source units 1000, the plurality of optical units 2000, or both may be integrally formed so as to reduce the number of components and simplify the assembly of the vehicle lamp 1. Each of the plurality of light source units 1000 may be configured as described above with regards to the single light source unit 1000. Each of the plurality of optical units 2000 may be configured as described above with regards to the single optical unit 2000. In some embodiments, the plurality of optical units 2000 may be integrally formed such that they are configured as one integrated component that covers all of the plurality of light source units 1000.

As described above, in the vehicle lamp 1, some of the incident lenses 2110 may be configured to include the first, second, and third incident regions 2112*a*, 2112*b*, and 2112*c*, so that even when the vehicle lamp 1 is installed in a tilted manner according to the body line of the vehicle, the high-illuminance region P1 and the spread region P2 of the low beam pattern P can be enhanced without the need for a separate optical system. Accordingly, the configuration of the vehicle lamp 1 can be simplified while still allowing for the formation of an optimal beam pattern.

One of ordinary skill in the art to which the present disclosure pertains will understand that the present disclosure can be implemented in other specific forms without changing the technical spirit or essential features. Therefore, the above-described embodiments should be regarded as illustrative in all respects and not limiting. The scope of the present disclosure is indicated by the following claims rather than the foregoing detailed description, and all variations or modified forms derived from the meaning, scope, and equivalents of the claims should be construed as being included within the scope of the present disclosure.

What is claimed is:

1. A vehicle lamp comprising:

a light source unit that generates light; and an optical unit configured to transmit therethrough at least a portion of the light incident from the light source unit to form a predetermined beam pattern, wherein the optical unit comprises: an incident lens unit that includes a plurality of incident lenses; and an emission lens unit that includes a plurality of emission lenses respectively corresponding to the plurality of incident lenses, wherein a plurality of lens rows, in each of which the plurality of incident lenses and the plurality of emission lenses extend in a left-right direction, are arranged in an up-down direction, wherein each of the plurality of lens rows is inclined to allow one side thereof to be disposed higher than the other side with respect to a horizontal line, wherein lens rows formed by the plurality of incident lenses comprise a first lens row and a second lens row, and wherein the plurality of incident lenses comprise:

a first incident lens that forms the first lens row; and a second incident lens that forms the second lens row and includes a plurality of incident regions disposed along the left-right direction, wherein the plurality of incident regions have different light-concentrating powers such that at least two of the plurality of incident regions focus the light incident thereto to different positions.

2. The vehicle lamp of claim 1, wherein the light source unit comprises:

a light source that generates the light; and a light path adjustment unit configured to convert the light emitted from the light source into substantially parallel light and to allow the parallel light to be incident on the optical unit.

3. The vehicle lamp of claim 1, wherein the first lens row and the second lens row are alternately arranged in the up-down direction.

4. The vehicle lamp of claim 1, wherein the first lens row is formed by a single first incident lens, and wherein the second lens row is formed by a plurality of second incident lenses.

5. The vehicle lamp of claim 1, wherein the first incident lens is formed as a cylindrical lens.

6. The vehicle lamp of claim 1, wherein the light incident through the second incident lens is emitted through a pair of adjacent first and second emission lenses among the plurality of emission lenses, and wherein the plurality of incident regions comprise a first incident region and a second incident region formed to have different widths in the left-right direction.

7. The vehicle lamp of claim 6, wherein the first incident region is configured such that the light incident through the second incident lens is collimated at or near a rear focal point of one of the first emission lens or the second emission lens and is emitted through the corresponding first or second emission lens, to reinforce a high-illuminance region of the beam pattern.

8. The vehicle lamp of claim 7, wherein the light incident through the first incident region is emitted through one of the first emission lens or the second emission lens in a direction substantially parallel to an optical axis of the light source unit.

9. The vehicle lamp of claim 6, wherein the second incident region is configured such that the light incident through the second incident lens is collimated at a point disposed more rearward compared to the light collimated by the first incident region and is emitted through both the first emission lens and the second emission lens, to reinforce a spread region of the beam pattern.

10. The vehicle lamp of claim 6, wherein the first incident region is formed to have a greater width than the second incident region.

11. The vehicle lamp of claim 6, wherein the plurality of incident regions further comprise a third incident region configured to allow the light incident through the second incident lens to proceed as substantially parallel light.

12. The vehicle lamp of claim 11, wherein the third incident region is disposed between the first incident region and the second incident region.

13. The vehicle lamp of claim 1, wherein the incident lens unit includes a first light transmission portion that includes the plurality of incident lenses arranged on an incident surface thereof, wherein the emission lens unit includes a second light transmission portion that includes the plurality of emission lenses disposed on an emission surface thereof, and wherein an emission surface of the first light transmission portion and an incident surface of the second light transmission portion abut each other.

14. The vehicle lamp of claim 13, wherein an interface between the first light transmission portion and the second light transmission portion is a plane on which focal points of the plurality of emission lenses are disposed.

15. The vehicle lamp of claim 13, wherein the plurality of emission lenses are formed thicker than the plurality of incident lenses, and wherein the first light transmission portion is formed thicker than the second light transmission portion.

16. The vehicle lamp of claim 1, wherein the optical unit is tilted such that one side in a left-right direction is disposed more forward relative to the other side thereof.

* * * * *